United States Patent [19]

Bauer et al.

[11] 4,425,179

[45] Jan. 10, 1984

[54] ADHESIVE COMPOSITIONS

[75] Inventors: Herbert Bauer, Lutry, Switzerland; Gerhard Piestert, Schwetzingen, Fed. Rep. of Germany

[73] Assignee: USM Corporation, Farmington, Conn.

[21] Appl. No.: 199,349

[22] Filed: Oct. 21, 1980

[51] Int. Cl.³ .................................................. C09J 5/02
[52] U.S. Cl. ............................. 156/307.5; 106/287.21; 156/310; 156/314; 156/332; 523/176; 526/204; 526/323.1; 526/328
[58] Field of Search ............ 427/302, 340, 333, 407.1; 526/204, 328, 323.1; 156/307.5, 314, 310, 332, 331.5; 106/287.21; 523/176

[56] References Cited

U.S. PATENT DOCUMENTS

| | | | |
|---|---|---|---|
| 2,578,910 | 12/1951 | Uraneck | 526/204 |
| 3,193,536 | 7/1965 | Wagner et al. | 526/328 |
| 3,658,624 | 4/1972 | Lees | 156/310 |
| 3,837,963 | 9/1974 | Frauenglass et al. | 156/310 |
| 3,855,040 | 12/1974 | Malofsky | 156/332 |
| 4,055,542 | 10/1977 | Saito | 526/204 |
| 4,285,755 | 8/1981 | Piestert et al. | 156/314 |

*Primary Examiner*—John J. Gallagher
*Attorney, Agent, or Firm*—John P. Morley

[57] ABSTRACT

Novel, improved adhesive compositions which are curable at ambient temperature to form adhesive bonds between substrates without external application of heat, light or other radiation. The adhesive compositions comprise one or more ethylenically unsaturated compounds such as polymerizable acrylic or methacrylic acid esters, a source of free radicals, and an activator comprising a pyrazoline compound.

15 Claims, No Drawings

ADHESIVE COMPOSITIONS

BACKGROUND OF THE INVENTION (1) The Field of the Invention

This invention relates to improved adhesive compositions. More precisely, this invention relates to adhesive compositions including ethylenically unsaturated compounds, a source of free radicals and an activator comprising a pyrazoline compound.

(2) Description of the Prior Art

Many polymerizable compositions are known which are believed to cure or harden by free radical polymerization of ethylenically unsaturated components. Such components may include for example acrylic or methacrylic monomers, vinyl chloride, vinylidene chloride, vinyl acetate, styrene, itaconic acid, maleic acid, and unsaturated polyesters.

In the field of polymerizable adhesives for example, reactive fluid adhesive compositions are known which cure at room temperature by addition polymerization of monomeric components to provide adhesive bonds between surfaces of many different materials. Adhesive compositions intended to cure between opaque, impervious, or other materials to form an adhesive bond may comprise one or more polymerizable acrylate or methacrylate ester monomers, a source of free radicals such as a peroxide, hydroperoxide, per ester or per acid, and an activator for interaction with the source of free radicals to initiate polymerization of the monomers at room temperature. The source of free radicals and the activator may be stored separated from each other prior to use of the adhesive; for example one of them may be incorporated in admixture with the monomers during storage. In this way, the adhesive composition comprises two parts and the composition is cured to form an adhesive bond when the two parts are brought together in absence of oxygen.

In one particularly convenient method of using two part reactive fluid adhesives, one part of the composition comprising the activator is applied to a surface to be bonded in the manner and form of a primer. Thereafter, the other part of the composition comprising the polymerizable monomers and source of free radicals is applied to the primer coated surface. This method permits the use of the adhesive composition without the necessity of mixing the two parts to application. The activator is conveniently one which can be used in non-stoichiometric quantities with respect to the monomers.

While bonds formed from two part adhesive compositions are highly useful, certain two part compositions comprise amine-aldehyde reaction products as activators which are liquid materials having a certain degree of toxicity and offensive odor. In view of the increasing emphasis in favor of using non-toxic materials in commercial products, it is desirable to provide an adhesive composition comprising an activator system having a more acceptable level of toxicity and odor. In this context, the use of solid materials as activators may be an apparent consideration. However, the achievement of a commercially acceptable adhesive bond usually implies that bond forming materials cannot be present in the bond in solid form.

An object of the present invention is to provide an activator for use with polymerizable, room temperature curing adhesive compositions comprising ethylenically unsaturated monomeric acrylate and methacrylate esters, and to provide adhesive compositions including such activators.

Another object of the present invention is to provide an activator for use with polymerizable compositions comprising ethylenically unsaturated monomers, which activator comprises material which can be readily manufactured from relatively inexpensive raw materials.

Other objects and advantages of the present invention will be apparent from the following description of the invention and the preferred embodiments thereof.

SUMMARY OF THE INVENTION

The adhesive compositions of this invention are curable at ambient temperature to form adhesive bonds between for example opaque, impervious, substrates without external application of heat, light or other radiation, and comprise one or more ethylenically unsaturated compounds for example polymerizable acrylic or methacrylic acid esters, a source of free radicals, and an activator comprising a pyrazoline compound.

DETAILED DESCRIPTION OF PREFERRED EMBODIMENT

The pyrazoline compounds of the adhesive composition of this invention are substituted pyrazolines which conform to the following formula:

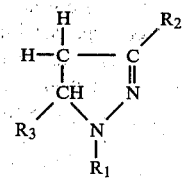

in which each $R_1$, $R_2$ and $R_3$ may be hydrogen, or an aromatic or aliphatic residue. Preferred pyrazolene compounds are those in which two or more of $R_1$, $R_2$, $R_3$ are phenyl, for example in which $R_2$ is hydrogen, $R_1$ and $R_3$ are phenyl groups (1,5 diphenyl pyrazoline) or in which $R_1$, $R_2$ and $R_3$ are each phenyl groups (1,3,5 triphenyl pyrazoline).

These pyrazoline compounds can be made by a simple condensation reaction between a substituted hydrazine and an ethylenically unsaturated carbonyl compound (which may be a ketone or aldehyde including the grouping —CH=CH—C=O, for example, a substituted acetophenone). The reaction scheme is shown below in which $R_1$, $R_2$ and $R_3$ are as described above.

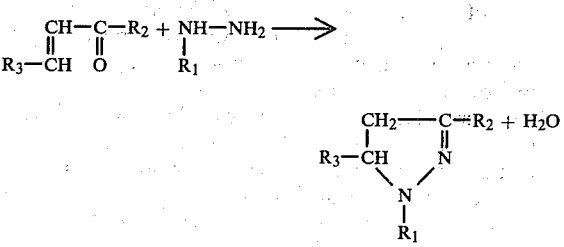

The reaction may be carried out in a very simple way for example between benzylidene actophenone and phenyl hydrazine at room temperature for 24 hours without a catalyst to yield 1,3,5 triphenyl pyrazoline. After this reaction the material is ready for use, and it is not essential to remove water from the product.

Examples of particularly useful substituted pyrazolines are 1,3,5-triphenyl pyrazoline and 1.5-diphenyl pyrazoline. It is believed that these substituted pyrazolines in the presence of a source of free radicals such as a peroxide or hydroperoxide in the adhesive composition are oxidized to yield the corresponding pyrazole and free radicals according to the following scheme:

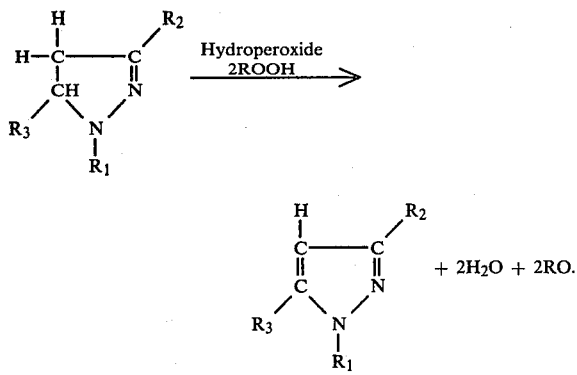

It will be apparent that the speed of this oxidation at a given required temperature is influenced by the nature and effect of the substituents $R_1$, $R_2$, $R_3$ on the C—H bonds of the C atoms at the 4 and 5 positions of the ring. The pyrazoline compound employed is selected with a view to providing required setting time for the polymerizable composition and also required storage stability characteristics of the activator.

The preferred activators are soluble to an acceptable extent in volatile organic solvent for application to a substrate. They are regarded as odorless, non-toxic materials, and at room temperature, in conjunction with acrylic and methacrylic acid ester monomers and a source of free radicals provide adhesive bonds of good strength and performance between impervious substrates.

The source of free radicals and the activator are stored in separate containers prior to use. Preferably the source of free radicals is included with the polymerizable monomers in the first or adhesive part together with inhibitors and stored in polyethylene bottles including a significant quantity of atmospheric oxygen in order to maintain stability of the first part. The activator is preferably stored as a solution in organic solvent to provide a second or activator part of the adhesive composition.

As mentioned, the activator part is not required to be mixed in stoichiometric quantities with the adhesive part of the composition. In use, the activator part and adhesive part of the composition may be mixed together just prior to use, or the activator part may be applied to one or both substrates and the polymerizable adhesive part applied later to the surface of the substrate carrying the applied activator. The activator part preferably comprises sufficient organic solvent so that the activator part may be readily applied to the substrate such as by brushing to provide a very thin, solid deposit after evaporation of the solvent. Alternatively, the activator part may be packaged with a propellant in an aerosol container from which required quantities may be readily dispensed. Additional materials may be included in the activator part as required. For example film forming polymeric material(s) or liquid polymerizable monomer(s) may be included such as a methacrylate ester monomer which may be 2-hydroxypropyl methacrylate or trimethylol propane trimethacrylate or a mixture thereof, with a view to achieving the required deposit on the substrate.

The activator part may conveniently comprise from about 0.5 up to about 5% by weight of the selected pyrazoline compound in an organic solvent such as methanol, toluene, methylene chloride or mixtures of these. These activator parts are effective in the presence of a source of free radicals to bring about cure in the absence of oxygen (air) of polymerizable adhesive parts comprising one or more ethylenically unsaturated compounds. The time required to bring about setting of the composition is comparatively short, and may be reduced further by inclusion in the activator part of certain promoters such as sulphur-containing and/or transition metal compounds. When used here, the expression "transition metal" means a metal which is capable of more than one stable valency state and which is capable of forming complexes. Notable examples of such metals are vanadium, chromium, manganese, iron, cobalt, nickel and copper. For rapid setting, mixtures of these materials may be employed such as a mixture of 0.1 to 1% by weight of the solution of sulphur-containing compound and 0.05 to 0.5% by weight of the solution of transition metal compound. The preferred materials are soluble in commonly used organic solvents.

Where solid promoter materials are used, it is preferred to include in the activator part a small amount of liquid monomer capable of retaining the solids in a thin film laid down from the activator part.

Sulphur compounds for use in activator parts according to the invention include among others, organic thiols, organic disulphides and organic sulphur compounds also having nitrogen in their molecule. Suitable organic thiols (RSH) include dodecylmercaptan, octylmercaptan, phenyldimercaptan and thioglycolic acid. Suitable organic disulphides (R—S—S—R') include phenyldisulphide. Suitable organic compounds also having nitrogen in their molecule include thioacetamide, tetramethylthiouramdisulphide, thiocarbanilide, thiourea, 1-allyl-2-thiourea, 2-mercapthothiazoline, 2-mercaptobenzothiazole and 2,5-dimercapto-1,3,4-thiadiazole.

Transition metal compounds for use in activator parts according to the invention include compounds comprising the metal as a chelated compound for example with a β-diketone or ethylene or propylene diamine, or as a compound of an organic acid or alcohol for example naphenates (e.g. of cobalt, nickel, manganese), octoates (e.g. of copper), hexoates and propionates (e.g. of iron). Preferred materials are acetyl acetonates of vanadium, copper, cobalt and iron.

Polymerizable adhesive parts comprising one or more ethylenically unsaturated compounds, which can be beneficially employed with activators of the present invention include room temperature curable adhesive compositions such as those which are stable when stored with air in polyethylene bottles but which polymerize between opaque, impervious, surfaces by virtue of exclusion of oxygen from the bond line. Suitable adhesives include—and preferably are—those comprising one or more of the diacrylates or dimethacrylates of mono, di, tri or tetra ethylene glycol, trimethacrylates from trihydric alcohols such as trimethylol propane trimethacrylate, hydroxy and glycidyl terminated esters of acrylic and methacrylic acid for example 2-hydroxypropyl methacrylate, hydroxyethyl methacrylate, glycidyl methacrylate and reaction products of these latter having two or more acrylate or methacrylate terminal groups such as those derived from 2-hydroxy propyl methacrylate and pyromellitic acid dianhydride, and acrylates and methacrylates derived from epoxy resins, and mixtures thereof. Polymers such as butadiene acrylonitrile, and polymethyl methacrylate may also be included in the adhesive part together with adhesion promoters, acrylic or methacrylic acid, and normal additives for adhesive compositions if desired.

Inhibitors (e.g. hydroquinone or 2,6,di-t-butyl-4-methyl-phenol) are included in the first or adhesive part to inhibit spurious polymerization of the monomers.

Acrylates and methacrylates preferred for use in the adhesive compositions are tetraethylene glycol dimethacrylate, trimethylol propane trimethacrylate, 2-hydroxypropylmethacrylate, glycidylmethacrylate, and a diacrylate derived from an epoxy resin and mixtures of two or more thereof.

The source of free radicals is maintained separate from the activator part prior to polymerization and is preferably incorporated in the first or adhesive part with the polymerizable monomers. Suitable sources of free radicals include organic peroxides (including hydroperoxides) peresters and peracids. Preferred materials are cumene hydroperoxide and 2,5-dimethyl-2,5-di(t-butyl-peroxy) hexane.

From the above description, it should be apparent that the present invention involves two closely related aspects. In one of the aspects, the invention provides an activator part comprising a pyrazoline compound for use in initiating polymerization of a polymerizable composition comprising one or more ethylenically unsaturated compounds in presence of a source of free radicals. In the other aspect, the invention provides a two part adhesive composition curable at room temperature to provide an adhesive bond, the composition comprising ethylenically unsaturated monomer, a source of free radicals and an activator according to the invention.

The advantages of the invention as well as the manner of making and using it will be more fully appreciated by the following illustrative, non-limiting Example.

EXAMPLE

Each of the compositions referred to below was in two parts. A first or adhesive part comprised one or more polymerizable materials comprising one or more acrylic or methacrylic acid residues per molecule, and a source of free radicals. A second or activator part comprised an activator capable of cooperation with the source of free radicals (at the time of intimate contact between the two parts) when located between two impervious substrates with exclusion of oxygen to bring about curing of the adhesive to bond the substrates together without external application of heat or actinic radiation.

The first part of an adhesive composition fluid at 20° C. was made up using ingredients in amounts by weight as follows:

| Component | Example first part of adhesive |
| --- | --- |
| Tetraethylene glycol dimethacrylate | 32 |
| Trimethylolpropane trimethacrylate | 20 |
| 2-Hydroxypropyl methacrylate | 30 |
| Acrylic acid | 10 |
| Butadiene acrylonitrile rubber | 5 |

-continued

| Component | Example first part of adhesive |
| --- | --- |
| Cumene hydroperoxide | 3 |
| Hydroquinone | 0.1 |

The butadiene acrylonitrile rubber used was Perbunan N3807NS supplied by Bayer AG.

The first part of the adhesive composition was made up by dissolving the rubber in methylene chloride, adding the other components with the exception of the cumene hydroperoxide, and then removing the methylene chloride by distillation at 50° C. under vacuum. After cooling the solution to room temperature, the cumene hydroperoxide was added.

Various activator parts comprising a pyrazoline compound alone or with a sulphur containing compound and/or a transition metal compound were made up using methanol, toluol or methylene chloride as solvent as shown in the Table which follows. Pyrazoline compounds were prepared as follows:

1,3,5-Triphenylpyrazoline 20.8 g benzylideneacetophenone was condensed with 10.8 g phenylhydrazine in 400 ml boiling ethanol over 5 hours, and then allowed to cool. During the cooling process the desired reaction product separates. The sediment was filtered, washed with ethanol and dried.

Melting point: 134° C.

This material was used in preparing activator parts 1-4 and 9-15 of the Table which follows.

The activator solution, ready for use, can also be obtained in good yield when the benzylideneacetophenone and phenylhydrazine are dissolved in an ethanol-toluene mixture and stored at room temperature for 24 hours.

1,5-Diphenylpyrazoline 13.2 g Zimtaldehyde (cinnamaldehyde) was condensed with 10.8 g Phenylhydrazine in 300 ml boiling acetic acid over 2 hours. At room temperature the sediment was filtered, washed with ethanol and dried.

Melting point: 125°-135° C.

This material was used in preparing activator parts 5-8 in the Table which follows.

The setting time of various adhesive-activator combinations was determined on glass plate substrates at room temperature (23° C. +2° C.).

The glass was solvent wiped, and a thin layer of the activator applied to one of the surfaces to be bonded and the solvent allowed to evaporate. The adhesive part was applied as a thin layer and the glass plates pressed together in partially overlapping relation with the adhesive between them. The bonds were tested by pulling the glass plates apart by hand. When this could no longer be done, the adhesive was regarded as set. The shortest time after which the bonds could not be opened manually was recorded as the setting time. The results are set forth in the Table which follows. It was observed that the activators retained their activating ability for some time after application to the surface.

Each of the pyrazoline compounds was used in conjunction with selected metal compounds and with selected sulphur containing compounds and mixtures thereof in activator parts with the first or adhesive part. The activated adhesives cured at room temperature to provide satisfactory adhesive bonds to a variety of opaque and transparent surfaces. The setting times achieved on glass plates prepared as above are shown in the Table which follows.

From these results it can be seen that a setting time of less than two hours at room temperature of the adhesive and activator combination can be achieved with the selected pyrazoline compounds. Further it can be seen that setting times at room temperature can be reduced by inclusion of selected sulphur compounds or metal compounds alone or in combination. Thus by appropriate selection of materials, setting times at room temperature of a few seconds or several minutes or even hours may be achieved.

It should be noted that the setting times were measured on glass substrates in order that the comparison between various combinations of first or adhesive part and second or activator part should not be unduly influenced by possible catalytic effect of the substrate surface on the curing reaction. In practice, the adhesive compositions are required to be capable of use to give satisfactory adhesive bonds by curing at room temperature in bonds using any of a variety of substrate materials some of which (e.g. steel, copper, brass and stainless-steel) are likely to have a significant effect in reducing the setting time and some of which (e.g. chromium, zinc, and tin) are likely to have less effect or even no significant effect (e.g. pvc) on the setting time.

A further factor requiring consideration is the desirability for the adhesive compositions to be capable of use and performance without additional use of externally applied heat, light or other curing treatment under a variety of normal ambient temperature conditions ranging from at least about 5° C. to 30° C.

TABLE

| Setting Time of Adhesive Compositions | |
|---|---|
| Activator Composition | Setting Time |
| 1 1,3,5-Triphenylpyrazoline (2% in Toluol) | 3 hours |
| 2 1,3,5-Triphenylpyrazoline + 0.1% Va AcAc (2% in Toluol) | 1 hour |
| 3 1,3,5-Triphenylpyrazoline + 0.1% Va OAcAc (2% in Toluol) | 1 hour |
| 4 1,3,5-Triphenylpyrazoline + 0.1% Cu AcAc (2% in Toluol) | 2 hours |
| 5 1,5-Diphenylpyrazoline (2% in methylenechloride) | 16 hours |
| 6 1,5-Diphenylpyrazoline + 0.1% Va AcAc (2% in methylenechloride) | 1 minute |
| 7 1,5-Diphenylpyrazoline + 0.1% Va OAcAc (2% in methylenechloride) | 1 minute |
| 8 1,5-Diphenylpyrazoline + 0.1% Cu AcAc (2% in methylenechloride) | 3 hours |
| 9 1,3,5-Triphenylpyrazoline (2% in methylenechloride) | — |
| 10 1,3,5-Triphenylpyrazoline + 1% dodecylmercaptan (2% in methylenechloride) | 1 hour |
| 11 1,3,5-Triphenylpyrazoline + 0.1% Va AcAc (2% in methylenechloride) | 1 minute |
| 12 1,3,5-Triphenylpyrazoline + 1% thioglycolic acid (2% in methylenechloride) | 4 minutes |
| 13 1,3,5-Triphenylpyrazoline + 0.1% Va AcAc (2% in methylenechloride) | 10 seconds |
| 14 1,3,5-Triphenylpyrazoline + 1% Allylthiourea (2% in methylenechloride) | 6 minutes |
| 15 1,3,5-Triphenylpyrazoline + 0.1% Va AcAc (2% in methylenechloride) | 15 seconds |

Va AcAc signifies Vanadium (III) acetonyl acetonate.
Cu AcAc signifies copper (II) acetonyl acetonate.
Va OAcAc signifies Vanadium (IV) oxide acetonyl acetonate.

We claim:

1. An activator composition which comprises a dispersion of a substituted pyrazoline compound conforming to the following formula:

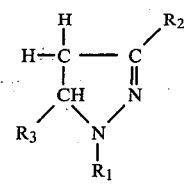

in which $R_1$, $R_2$ and $R_3$ may be the same or different and may be hydrogen, or an aromatic or aliphatic residue, and a promoter comprising a mixture of a sulfur containing compound chosen from the consisting of organic thiols, organic disulfides, organic sulfur compounds having nitrogen in their molecule or mixtures of these and a transition metal compound chosen from the group consisting of vanadium (III) acetonyl acetonate, copper (II) acetonyl acetonate, vanadium (IV) oxide-acetyl acetonate or mixtures of these, said activator composition having the capability of initiating polymerization at room temperature on combination with a polymerizable adhesive composition to provide a cured adhesive composition where said polymerizable adhesive composition comprises a source of free radicals and an ethylenically unsaturated monomer selected from the group consisting of diacrylates or dimethacrylates of mono, di, tri or tetraethylene glycol, trimethacrylates from trihydric alcohols, hydroxy and glycidyl terminated esters of acrylic and methacrylic acid and reaction products of these having two or more acrylate or methacrylate terminal groups, acrylates and methacrylates derived from epoxy resins and, mixtures of these monomers.

2. An activator composition of claim 1 where said pyrazoline and promoter are dispersed in a volatile organic solvent.

3. An activator composition of claim 1 where not less than two of $R_1$, $R_2$ and $R_3$ are phenyl groups and any remaining $R_1$, $R_2$ or $R_3$ are hydrogen.

4. An activator composition of claim 3 where said pyrazoline and promoter are dispersed in a volatile organic solvent.

5. A two part adhesive composition curable on combination at room temperature to provide a cured adhesive composition, one part of the composition being a polymerizable adhesive part comprising a source of free radicals and an ethylenically unsaturated monomer selected from the group consisting of diacrylates or dimethacrylates of mono, di, tri or tetraethylene glycol, trimethacrylates from trihydric alcohols, hydroxy and glycidyl terminated esters of acrylic and methacrylic acid and reaction products of these having two or more acrylate or methacrylate terminal groups, acrylates and methacrylates derived from epoxy resins and, mixtures of these monomers, the other part being an activator part which comprises a dispersion of a substituted pyrazoline compound conforming to the following formula:

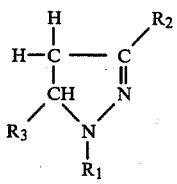

in which $R_1$, $R_2$ and $R_3$ may be of the same or different and may be hydrogen, or an aromatic or aliphatic residue and said activator composition further includes a promoter comprising a mixture of a sulfur containing compound chosen from the group consisting of organic thiols, organic disulfides, organic sulfur compounds having nitrogen in their molecule or mixtures of these, and a transition metal compound chosen from the group consisting of vanadium (III) acetyl acetonate, copper (II) acetonyl acetonate, vanadium (IV) oxide-acetyl acetonate or mixtures of these.

6. A two part adhesive composition of claim 5 where not less than two of $R_1$, $R_2$ and $R_3$ are phenyl groups and any remaining $R_1$, $R_2$ and $R_3$ are hydrogen.

7. A two part adhesive composition of claim 5 or claim 6 where said pyrazoline and promoter are dispersed in a volatile organic solvent.

8. A two part adhesive composition of claim 5 or claim 6 where said activator part also comprises a polymerizable methacrylate ester monomer.

9. A two part adhesive composition of claim 8 where the polymerizable methacrylate ester monomer is chosen from the group consisting of 2-hydroxypropyl methacrylate, trimethylol propane trimethacrylate or a mixture of these.

10. A two part adhesive composition of claim 5 or claim 6 where said monomer of the polymerizable adhesive part is chosen from the group consisting of tetraethylene glycol dimethacrylate, trimethylol propane trimethacrylate, 2-hydroxypropyl methacrylate, glycidyl methacrylate, a diacrylate or dimethacrylate derived from an epoxy resin, a dimethacrylate derived from 2-hydroxypropyl dimethacrylate and pyromellitic acid dianhydride, or mixtures of these.

11. A two part adhesive composition of claim 5 or claim 6 where said polymerizable adhesive part also comprises acrylic acid and a source of free radicals comprising cumene hydroperoxide.

12. A two part adhesive composition of claim 5 or claim 6 where said polymerizable adhesive part also comprises a butadiene acrylonitrile copolymer.

13. A two part adhesive composition of claim 5 or claim 6 where said polymerizable adhesive part includes a source of free radicals chosen from the group consisting of an organic peroxide, a hydroperoxide, a perester, a peracid or mixtures of these.

14. A method of adhesively bonding two air-impervious substrates at ambient temperature which comprises the steps of
    (a) applying to a surface of one or both of the substrates an activator composition of claim 1.
    (b) allowing the applied composition to dry,
    (c) applying to one of the surfaces carrying the applied activator composition a polymerizable composition comprising an ethylenically unsaturated monomer and a source of free radicals,
    (d) pressing the substrates together with the polymerizable and activator compositions in intimate contact with exclusion of air and
    (e) allowing polymerization of the monomer to form an adhesive bond between the surfaces.

15. A method of claim 14 where not less than two of $R_1$, $R_2$ and $R_3$ of the pyrazoline of the activator composition are phenyl groups and any remaining $R_1$, $R_2$ and $R_3$ are hydrogen.

* * * * *